US009929945B2

(12) United States Patent
Schultz et al.

(10) Patent No.: US 9,929,945 B2
(45) Date of Patent: Mar. 27, 2018

(54) HIGHLY AVAILABLE SERVICE CHAINS FOR NETWORK SERVICES

(71) Applicant: Microsoft Technology Licensing, LLC, Redmond, WA (US)

(72) Inventors: Benjamin M. Schultz, Bellevue, WA (US); Abhishek Tiwari, Redmond, WA (US); Aman Arneja, Bellevue, WA (US); Dhiraj Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 14/866,676

(22) Filed: Sep. 25, 2015

(65) Prior Publication Data

US 2017/0019335 A1 Jan. 19, 2017

Related U.S. Application Data

(60) Provisional application No. 62/192,489, filed on Jul. 14, 2015.

(51) Int. Cl.
*H04L 12/721* (2013.01)
*H04L 12/759* (2013.01)
(Continued)

(52) U.S. Cl.
CPC .......... *H04L 45/38* (2013.01); *H04L 43/0876* (2013.01); *H04L 45/025* (2013.01);
(Continued)

(58) Field of Classification Search
CPC ......... H04L 47/10; H04L 47/12; H04L 47/20; H04L 47/24; H04L 47/32; H04L 47/38;
(Continued)

(56) References Cited

U.S. PATENT DOCUMENTS 6,728,748 B1   4/2004  Mangipudi et al.
7,284,048 B2  10/2007  Jakobson et al.
(Continued)

FOREIGN PATENT DOCUMENTS

KR   101460048   11/2014
KR   101527377    6/2015
(Continued)

OTHER PUBLICATIONS

"Cisco SAFE for small Enterprise Networks", Cisco, retrieved from <<http://www.cisco.com/c/en/us/td/docs/solutions/Enterprise/Security/SAFE_RG/safesmallentnetworks.html>> on Jun. 25, 2015, updated Jul. 14, 2010, 86 pages.
(Continued)

*Primary Examiner* — Ashley Shivers
(74) *Attorney, Agent, or Firm* — Workman Nydegger

(57) ABSTRACT

A control and monitoring system orders a service chain—an order of data flow through a plurality of network nodes—based on network node identifiers. The control and monitoring system provide a policy to networking nodes in order to enforce the order of the service chain. In some embodiments, features are implemented to improve the availability of service chains. Such features include load-balancing, fail-over, traffic engineering, and automated deployment of virtualized network functions at various stages of a service chain, among others.

18 Claims, 10 Drawing Sheets

(51) Int. Cl.

| | | |
|---|---|---|
| *H04L 12/751* | (2013.01) | |
| *H04L 12/725* | (2013.01) | |
| *H04L 12/851* | (2013.01) | |
| *H04L 12/859* | (2013.01) | |
| *H04L 12/715* | (2013.01) | |
| *H04L 12/803* | (2013.01) | |
| H04L 12/24 | (2006.01) | |
| H04L 12/26 | (2006.01) | |

(52) U.S. Cl.
CPC .......... *H04L 45/028* (2013.01); *H04L 45/306* (2013.01); *H04L 45/64* (2013.01); *H04L 47/125* (2013.01); *H04L 47/2475* (2013.01); *H04L 47/2483* (2013.01); *H04L 41/0893* (2013.01); *H04L 41/5077* (2013.01); *H04L 43/50* (2013.01); *H04L 45/02* (2013.01); *H04L 47/2441* (2013.01)

(58) Field of Classification Search
CPC ......... H04L 47/70; H04L 47/72; H04L 47/74; H04L 47/78; H04L 47/80; H04L 47/22; H04L 47/225; H04L 47/18; H04L 47/11; H04L 47/115; H04L 47/26; H04L 47/33; H04L 47/35; H04L 12/56; H04L 29/06095; H04L 29/0653; H04L 45/74; H04L 49/3009; H04L 49/30; H04L 45/028; H04L 45/025; H04L 45/306; H04L 45/38; H04L 47/2483; H04L 47/2475; H04W 28/02; H04W 28/0205; H04W 28/021; H04W 28/0247; H04W 28/0252; H04W 28/0257; H04W 28/0263; H04W 28/0268; H04W 28/0273; H04W 28/0215; H04W 28/0221; H04W 28/0226; H04W 28/0231; H04W 28/0236; H04W 28/0242; H04W 28/00

See application file for complete search history.

(56) References Cited

U.S. PATENT DOCUMENTS

| | | |
|---|---|---|
| 7,363,353 B2 | 4/2008 | Ganesan et al. |
| 7,606,147 B2 | 10/2009 | Luft et al. |
| 8,442,043 B2 | 5/2013 | Sharma et al. |
| 8,621,573 B2 | 12/2013 | Bagepalli et al. |
| 8,743,885 B2 | 6/2014 | Khan et al. |
| 8,817,625 B1 | 8/2014 | Zhang et al. |
| 2004/0022191 A1 | 2/2004 | Bernet et al. |
| 2004/0111506 A1 | 6/2004 | Kundu et al. |
| 2007/0078996 A1 | 4/2007 | Chen et al. |
| 2009/0046728 A1 | 2/2009 | Matthews |
| 2009/0210534 A1 | 8/2009 | O'Connell |
| 2010/0313207 A1 | 12/2010 | Tanaka et al. |
| 2011/0314157 A1 | 12/2011 | Saito |
| 2012/0281540 A1* | 11/2012 | Khan .................... H04L 45/308 370/241 |
| 2013/0272305 A1 | 10/2013 | Lefebvre et al. |
| 2014/0010084 A1 | 1/2014 | Kavunder et al. |
| 2014/0334295 A1 | 11/2014 | Guichard et al. |
| 2014/0334488 A1 | 11/2014 | Guichard et al. |
| 2014/0355436 A1 | 12/2014 | Zhang et al. |
| 2014/0362682 A1 | 12/2014 | Guichard et al. |
| 2014/0372617 A1 | 12/2014 | Houyou et al. |
| 2015/0063102 A1 | 3/2015 | Mestery et al. |
| 2015/0092551 A1 | 4/2015 | Moisand et al. |
| 2015/0124815 A1 | 5/2015 | Beliveau et al. |
| 2016/0050117 A1* | 2/2016 | Voellmy .............. H04L 12/6418 370/392 |
| 2017/0019303 A1 | 1/2017 | Swamy et al. |
| 2017/0250869 A1* | 8/2017 | Voellmy .............. H04L 41/0893 |

FOREIGN PATENT DOCUMENTS

| | | |
|---|---|---|
| WO | WO2015010518 A1 | 1/2015 |
| WO | WO2015094040 A1 | 6/2015 |

OTHER PUBLICATIONS

"ECMP Load Balancing in the Service Chain", Retreived from <<http://www.juniper.net/techpubs/en_US/contrail1.0/topics/concept/load-balancing-vnc.html>>, Published Sep. 16, 2013, 2 pages.

Greenberg, et al., "Towards a Next Generation Data Center Architecture: Scalability and Commoditization", Proceedings of Programmable Routers for Extensible Services of Tomorrow (PRESTO'08), Aug. 2008, pp. 57-62.

"Network Functions Virtualisation—An Introduction, Benefits, Enablers, Challenges & Call for Action", Network Function Virtualisation—Introductory White Paper, SDN and OpenFlow World Congress, Oct. 2012, 16 pages.

Ramakrishnan, et al., "The Addition fo Explicit Congestion Notification (ECN) to IP", retrieved from <<http://tools.ietf.org/html/rfc3168>> on Jun. 29, 2015, Sep. 2001, 126 pages.

Rijsman, "Service Chain Load Balancing with OpenContrail", Retrieved from <<http://www.opencontrail.org/service-chain-load-balancing-with-opencontrail/>>, May 2, 2014, 10 pages.

Thaler, et al., "Multipath Issues in Unicast and Multicast Next-Hop Selection", retreived from <<http://tools.ietf.org/html/rfc2991>> on Jun. 29, 2015, Nov. 2000, 18 pages.

Wagner, "Who Does What: SDN Controllers", LightReading, Dec. 2014, 5 pages.

Wikipedia, "Network Functions Virtualization", Retrieved on Jul. 10, 2015 from <<https://en.wikipedia.org/wiki/Network_functions_virtualization>> on Jul. 10, 2015, Available at least as early as May 2015, 7 pages.

Wikipedia, "Open Daylight Project", Retrieved on Jul. 10, 2015 from <<https://en.wikipedia.org/wiki/OpenDaylight_Project>>, Available at least as early as Jun. 2015, 5 pages.

Wikipedia, "Software-Defined Networking", retrieved on Jul. 10, 2015 from ><https://en.wikipedia.org/wiki/Software-defined_networking>>, Available at least as early as Aug. 2014, 11 pages.

"International Search Report and Written Opinion Issued in PCT Application No. PCT/US2016/042176", dated Oct. 26, 2016, 14 Pages.

Lee, et al., "Resource Management in Service Chaining draft-lee-nfvrg-resource-management-service-chain-01", In Internet Research Task Force, Internet-Draft, Mar. 9, 2015, 11 Pages.

Lee, et al., "SFC dynamic instantiation draft-lee-sfc-dynamic-instantiation-01", In Service Function Chaining, Internet-Draft, Oct. 27, 2014, 9 Pages.

International Search Report and Written Opinion for PCT/US2016/042175, dated Oct. 26, 2016, 13 pages.

Zhang, et al., "StEERING: A Software-Defined Networking for Inline Service Chaining", 2013 21st IEEE International Conference on Network Protocols (ICNP), IEEE, Oct. 7, 2013, pp. 1-10, 10 pages.

The PCT International Preliminary Report on Patentaiblity dated Apr. 10, 2017 for PCT application No. PCT/US2016/042176, 17 pages.

The PCT International Preliminary Report on Patentaiblity dated Apr. 7, 2017 for PCT application No. PCT/US2016/042175, 16 pages.

\* cited by examiner

HIGHLY AVAILABLE SERVICE CHAINS FOR NETWORK SERVICES

RELATED APPLICATIONS

This application claims priority to U.S. Provisional Application No. 62/192,489, filed Jul. 14, 2015, and entitled "Service Chains for Network Services," the entire contents of which are hereby incorporated herein by reference. This application is related to concurrently filed U.S. Nonprovisional application Ser. No. 14/866,556, entitled "Service Chains for Network Services," the entire contents of which are hereby incorporated herein by reference.

BACKGROUND

In a conventional networking arrangement, network appliances—such as firewalls, distributed denial of services (DDoS) appliances, deep packet inspection (DPI) devices, load balancers, anti-virus inspection servers, virtual private network (VPN) appliances, and so forth—are physically wired in a chained arrangement at the edge of the network. Data packets arriving from an external network (such as from the public Internet) pass through one or more network appliances before arriving at an application service node, such as a web server, proxy server, email server, or other type of application service node.

Lately, there have been developments in virtualization of networking functions, such as network functions virtualization (NFV). NFV is a network concept that virtualizes various network functions, implementing them as virtual machines running networking-related software on top of standard servers, switches, and storage. Benefits include reduced equipment costs, reduced power consumption, increased flexibility, reduced time-to-market for new technologies, the ability to introduce targeted service introduction, as well as others. Also, software-defined networking (SDN) is a mechanism in which a control plane interfaces with both SDN applications and SDN datapaths. SDN applications communicate network requirements to the control plane via a Northbound Interface (NBI). SDN datapaths advertise and provide control to its forwarding and data processing capabilities over an SDN Control to Data-Plane Interface (CDPI). SDN effectively defines and controls the decisions over where data is forwarded, separating this intelligence from the underlying systems that physically handle the network traffic. In summary, the SDN applications define the topology; the clients, servers and NVF components are the nodes ("hubs" and "endpoints") in the topology; the SDN datapaths are the "spokes" that connect everything together.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present disclosure provide systems, methods, and apparatuses for implementing automated service chaining in a network service or a virtualized network service. A control and monitoring system tracks a plurality of network nodes in a service chain based on network node identifiers (e.g., addresses or other identifiers). The control and monitoring system orders a service chain—an order of data flow through a plurality of network nodes—based on network node identifiers, and applies a policy to all networking nodes in order to enforce the order of the service chain. The policy may be applied at all network nodes in the service chain, such that each network node receives the data in the correct order, performs its function (e.g., firewall, anti-virus, DPI function, etc.), and forwards the data to the next-hop data link layer address in the service chain. In some embodiments, features are implemented to improve the availability of service chains. Such features include load-balancing, fail-over, traffic engineering, and automated deployment of virtualized network functions at various stages of a service chain, among others.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 7 is a schematic diagram that illustrates an example environment in which multiple service chains are chained together with a network layer endpoint node in between.

DETAILED DESCRIPTION

Figure 1:
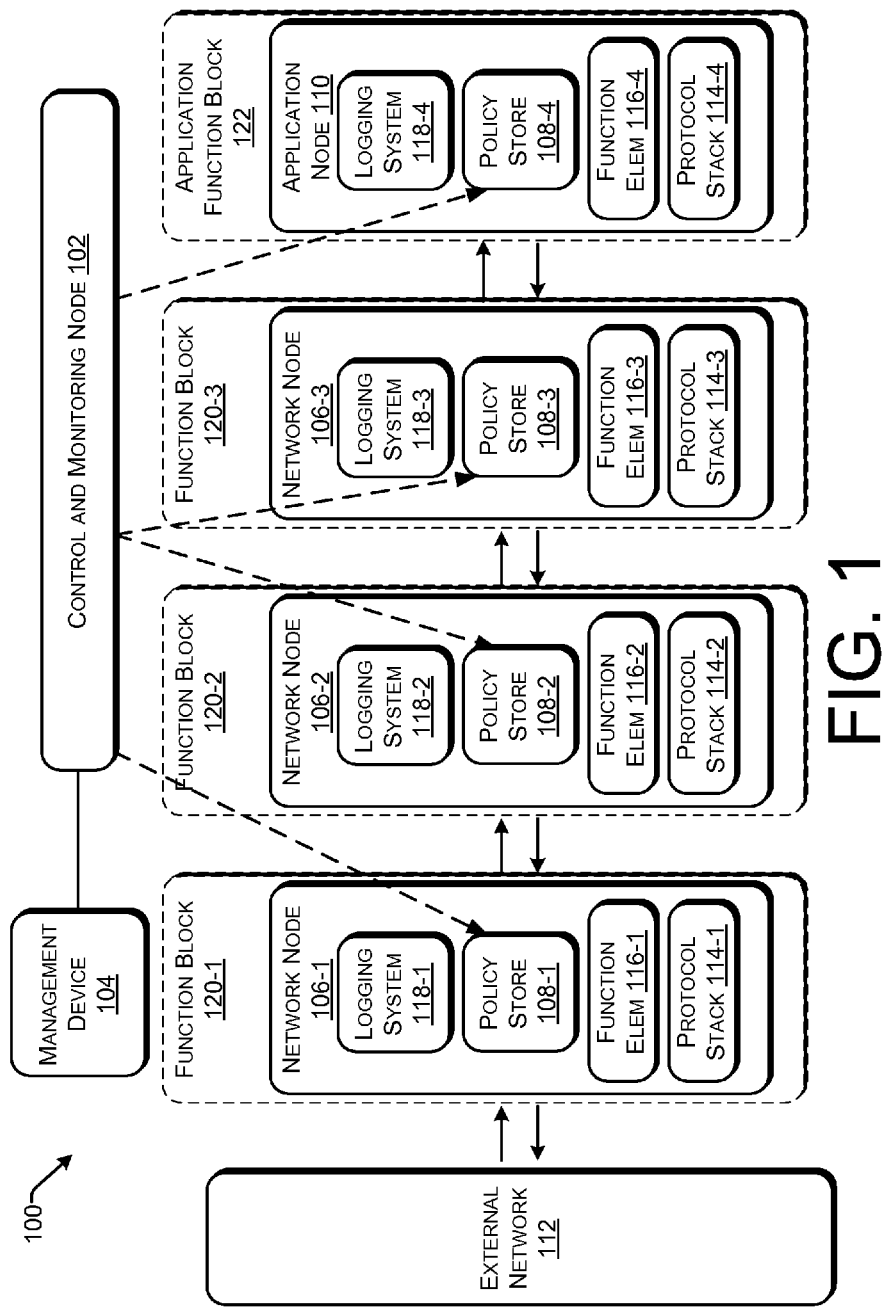
FIG. 1 is a schematic diagram that illustrates an example environment for deploying service chains using policies.

Embodiments of the present disclosure provide systems, methods, and apparatuses for implementing automated service chaining in a network and/or a virtualized network.

Recently, networked computing environments enable unprecedented accessibility to numbers of software applications that are used by consumers and businesses. Appliances such as firewalls, load balancers, etc., protect these software applications and make them highly available to client devices for experiences including shopping, email, streaming video, social media, and voice communications. New developments such as network functions virtualization are taking the software out of physical appliances and promise to add flexibility while cutting costs. To improve and automate deployment of such functionalities, network appliances may be chained to form a service chain that provides a platform to enable a network to deploy additional specialty network services beyond what natively has been built for that platform.

In one embodiment, a control and monitoring system may facilitate chaining of network appliances, automatically directing traffic through the appropriate network appliances for processing before it reaches the application. For example, the control and monitoring system tracks a plurality of network nodes in one or more service chains based on network node identifiers (e.g., addresses or other identifiers). The control and monitoring system orders a service chain such that an order of data flow through a plurality of network nodes is established. In one embodiment, a service chain may be ordered based on the network node identifiers. The control and monitoring system generates and applies polices to all networking nodes in order to enforce the order of the service chain. In some embodiments, a policy may include ingress data link layer addresses (e.g., media access control (MAC) addresses), next-hop data link layer addresses, and a queue rank for each, as well as other information. The policy may be applied at all network nodes in the service chain, such that each network node receives the data in the correct order, performs its function (e.g., firewall, anti-virus, DPI function, etc.), and forwards the data to the next-hop data link layer address in the service chain. The process repeats until the data packet reaches an application services node, which may be for example a file server, a web server, or other application services node. In some embodiments, a data link layer proxy (e.g., a MAC proxy) enforces the policy at each hop in the service chain. A policy may be identified for a data flow on a per-flow basis, such as based on a destination address (such as a destination IP address), based on protocol information (e.g., based on transport control protocol (TCP), user datagram protocol (UDP), real-time protocol (RTP), or other protocol), or based on other information, including a combination of information.

The data link layer proxy may be a switch, such as an 802.11 ("Ethernet") switch, which may be either a physical switch or a virtualized switch. In embodiments that utilize data link layer-based policies (e.g., MAC-based policies), the destination network layer address does not change, while the data link layer addresses to reach the destination address change according to the policy. This makes network layer destination (e.g., IP address) mismatches less likely, thereby improving reliability of the network.

In alternative embodiments, the policy is based on network layer protocol identifiers (e.g., Internet Protocol (IP) addresses). Such network layer protocol-based policies are enforced, in some embodiments, by network layer routing (e.g., IP routing) or by upper-layer protocols, such as by Hyper Text Transfer Protocol (HTTP) redirects.

In some embodiments, the network service nodes are granted various permissions to update the policy. A network service node may update the policy to introduce a new next-hop (e.g., a new network service node in the service chain), to skip a network node in the service chain, or to direct traffic to a new service chain. In one example, a firewall node in the service chain may determine to modify the policy to introduce a DPI node into the service chain, based on results of inspection of the data flow. Where the firewall node has permission to modify the policy in this way, the firewall may update the policy, such as by communicating with the control and monitoring system, which may in turn update the other network nodes in the service chain.

In some embodiments, features are implemented to improve the availability of service chains. Such features include, but are not limited to, load-balancing, fail-over, traffic engineering, and automated deployment of virtualized network functions at various stages of a service chain. In some embodiments, load balancing is performed by a load balancer, such as by a virtualized load balancer which is itself a virtualized network node that is part of a service chain. In some embodiments, load balancing is performed through policies, enforced by the service nodes in the service chains, which may be in addition to or instead of separate load-balancers. In some embodiments, load balancing is performed on a per-flow basis within a service chain.

Deployment of additional network nodes is performed under various circumstances. In some embodiments, where a network node fails, experiences high bandwidth utilization, or experiences limited available computing resources (e.g., CPU, storage, memory), the control and monitoring system causes deployment of another network node in the service chain to address the failure or to address the increased resource or bandwidth load. A new network node is deployed, and the policy is updated to enable traffic to flow to the new node, such as on a per-flow basis. The newly deployed network node may be made available—through policy updates—to one or more service chains, such that the new node provides resources to more than one service chain. In one example, a service chain experiences increased load at an anti-virus node within the service chain. Based on monitoring the resource utilization or bandwidth at the anti-virus node in the service chain, the control and monitoring system determines that the anti-virus node experiences load above a threshold, and causes another anti-virus node to be deployed, updating the policy to direct traffic to the newly deployed anti-virus node.

The description contained herein includes reference to layers of the Open Systems Interconnection (OSI) model, such as by reference to "layer 2," "layer 3," "data link layer," "network layer," and so forth. Such references are for ease of description only, and are not meant to imply that embodiments are necessarily completely or partially compatible with, or limited to, protocols that comply with the OSI model. And certain protocols may be described in reference to the OSI model, and in particular as being associated with certain OSI model layers. But such protocols (e.g., 802.11 protocols, TCP/IP protocols), may not fully or completely match up to any specific layer of the OSI model.

Embodiments of the present disclosure enable increased deployment flexibility, faster roll-out of new network services, higher reliability and increased security in a datacenter or cloud computing environment. Example implementations are provided below with reference to the following figures.

FIG. 1 illustrates an environment 100 for deploying service chains using policies. A control and monitoring node 102 receives, or automatically generates, policies that implement a service chain in the environment 100. A configuration may arrive from a management device 104, such as for example based on manual configuration of network nodes 106 to be included in the service chain, and the specified order of the service chain. The management device 104 may be a personal computer, a laptop, a tablet computer, or any computing system configured to interface with the control and monitoring node 102. In other embodiments, the service chain may be initiated, or reconfigured, based on intelligence gathered in the network by the control and monitoring node 102. For example, the control and monitoring node 102 may auto-discover network node capabilities by examining a policy store 108 of each network node 106 and an application node 110. The network nodes 106 may register with the control and monitoring node 102 as part of a discovery process. The control and monitoring node 102 may discover, track, and monitor the network nodes 106 based on an identifier of the network nodes, such as a MAC address, or other identifier. As new applications are deployed in the environment 100, and as applications are decommissioned, the configuring of the service chains is a dynamic process, thereby speeding up the process of deploying or decommissioning new applications. Each application node 110 has one or more service chains associated with it (there is only one service chain illustrated in FIG. 1 for the sake of illustration only).

Based on the network node 106 capabilities, the control and monitoring node 102 may determine an order of the service chain. For example, DDoS network nodes may be automatically placed prior to a VPN network node, and so forth. The policy stores 108 may indicate such capabilities.

An example policy of a service chain is shown in the table below:

| Node Capability | Network Node | Ingress Queue Rank | Egress Queue Rank | Ingress MAC Address | Egress MAC address (optional) | Next Hop MAC Address |
|---|---|---|---|---|---|---|
| DDoS | 106-1 | 1 | 3 | 00-00-FF-00-00-01 | 00-03-FF-00-00-02 | 00-03-FF-00-00-03 |
| Firewall | 106-2 | 2 | 2 | 00-03-FF-00-00-03 | — | 00-03-FF-00-00-04 |
| Anti-virus | 106-3 | 3 | 1 | 00-03-FF-00-00-04 | — | 00-03-FF-00-00-05 |
| Application | 110 | — | — | 00-03-FF-00-00-05 | — | 00-03-FF-00-00-04 |

In the example policy shown above, each network node 106 is given an ingress queue rank, such that data that flows into the environment 100 from the external network 112 is routed to the network nodes 106 in the order shown by the ingress rank before being provided to application node 110. In this example, the service chain includes network nodes 106-1, 106-2, and 106-3. Egress queue ranks indicate the order in which the data passes through the service chain from the application node 110 to the external network 112. In this example, the egress queue ranks indicate that the data flows in the opposite order as the ingress queue ranks (i.e., from 106-3, to 106-2, to 106-1). But it is possible for the egress queue ranks to indicate that data flows through the service chain in an order that is different than the opposite order. It is also possible for the egress queue ranks to indicate that egress traffic passes through more, fewer, or different network nodes 106 than ingress traffic. Thus, in some embodiments, the traffic flow through the service chains may be full-duplex (bi-directional) such that traffic flows through all network nodes 106 in both directions, simplex (uni-directional) such that traffic flows through the network nodes 106 in only one of the ingress or egress directions, or in some hybrid manner, such that some network nodes 106 are configured to process traffic in a bidirectional manner while other network nodes 106 are configured to process traffic in a unidirectional manner. In one example, a network node 106 that performs firewall functions may process traffic in both directions, while a DDoS network node 106 only monitors ingress traffic. Other example service chain policies are possible without departing from the scope of embodiments. Also, the node capabilities shown in the table above are for illustrative purposes only; example network node functions include, among other things, load balancing functions, firewall functions, VPN server functions, DDoS protection functions, Wide Area Networking (WAN) optimization functions, gateway functions, router functions, switching functions, proxy server functions, anti-spam functions, anti-virus (or more generally, anti-malware) functions, and so forth.

The policy stores 108 configure the protocol stacks 114 of each of the network nodes 106 to enforce the ordering of the service chain. In the example policy above, the ordering is enforced through next-hop data link layer addresses (in this example, next-hop MAC addresses). In some embodiments, the policy may be enforced based on other information, such as based on next-hop network layer addresses such as IP addresses, HTTP redirects, other information, or some combination of information. Thus, the configuring of the protocol stacks 114 may include configuring one or more of the data link layer, network layer, or other protocol layers within one or more of the protocol stacks 114, to indicate next hops in the service chain.

Each network node 106 includes a function element 116, such as a load balancing function element, firewall function element, VPN server function element, DDoS protection function element, Wide Area Networking (WAN) optimization function element, a gateway function element, a router function element, a proxy server function element, anti-spam function element, anti-virus (or more generally, anti-malware) function element, or other elements. The application node 110 includes a function element 116-4 to provide some kind of workload function, such as a datacenter workload function, which may be, according to some embodiments, a web server function, a database function, a search engine function, a file server function, and so forth. In some embodiments, the application node 110 may be accessible by client devices, such as end user client devices, enterprise client devices, or other devices.

As each network node 106 receives the data packets in the data flow (in ingress and/or egress directions), the network nodes 106 perform their functionality according to their function element 116, prior to delivering the data packets to the next-hop address in the service chain policy. Each network node 106 logs data, such as performance data, using a logging system 118. The logging system 118 provides log data to the control and monitoring node 102, which may perform various functions, such as monitoring the service chain, deploying a new function block, re-ordering the service chain, implementing load-balancing, and other functions, some of which are described in more detail elsewhere within this Detailed Description.

The network nodes 106 are coupled to each other, to the application node 110, to the external network 112, to the control and monitoring node 102, etc., through some underlying network architecture, such as via an Ethernet switched network, and IP routed network, or other. The network architecture may provide any-to-any connectivity, with network flows controlled through the policy stores 108. The network architecture may be any wired or wireless technology, and thus may include WiFi, mobile broadband, or other. The network nodes 106 may include one or more physical computing systems, and different ones of the network nodes 106, the application node 110, and/or the control and monitoring node 102 may share one or more physical computing systems. The network nodes 106 may be considered to be instantiated as function blocks 120, which include a virtual machine that implements the network nodes 106, on one or more computing systems. The application node 110 may also be instantiated as an application function block 122, which include a virtual machine that implements the application nodes 110 on one or more computing systems. The environment 100 may be part of a cloud computing arrangement, in which application services are provided to end user devices, to other servers, nodes, systems, or devices via one or more application nodes 110, with network connectivity to the external networks from which the end user devices access the application services, via the service chain of network nodes 106. The end user devices, or other servers, nodes, systems, or devices, may include a laptop computer, a desktop computer, a kiosk computing system, a mobile device (such as a mobile phone, tablet, media player, personal data assistant, handheld gaming system, etc.), a game console, a smart television, an enterprise computing system, and so on.

The policies defined by the control and monitoring node 102 may also define aspects of the environment 100. For example, the control and monitoring node 102 may define standardized software and hardware for function blocks of the same type and/or application function blocks of the same type. The policy may also define permissions that enable function blocks and/or application function blocks to redirect traffic and/or change the policies in certain ways, and based on certain events. Examples of these are described in more detail elsewhere within this Detailed Description.

As with the network nodes 106, the application node 110 also includes a policy store 108-4. Thus, in some embodiments, the application node 110 may also be considered part of the service chain. This might be utilized in embodiments with multiple application nodes, where the destination network layer (e.g., IP layer) address is the same for all application nodes, but traffic is routed to each one based on next-hop data link layer address (e.g., MAC addresses), rather than based on IP address. Other examples are possible without departing from the scope of embodiments.

Figure 2:
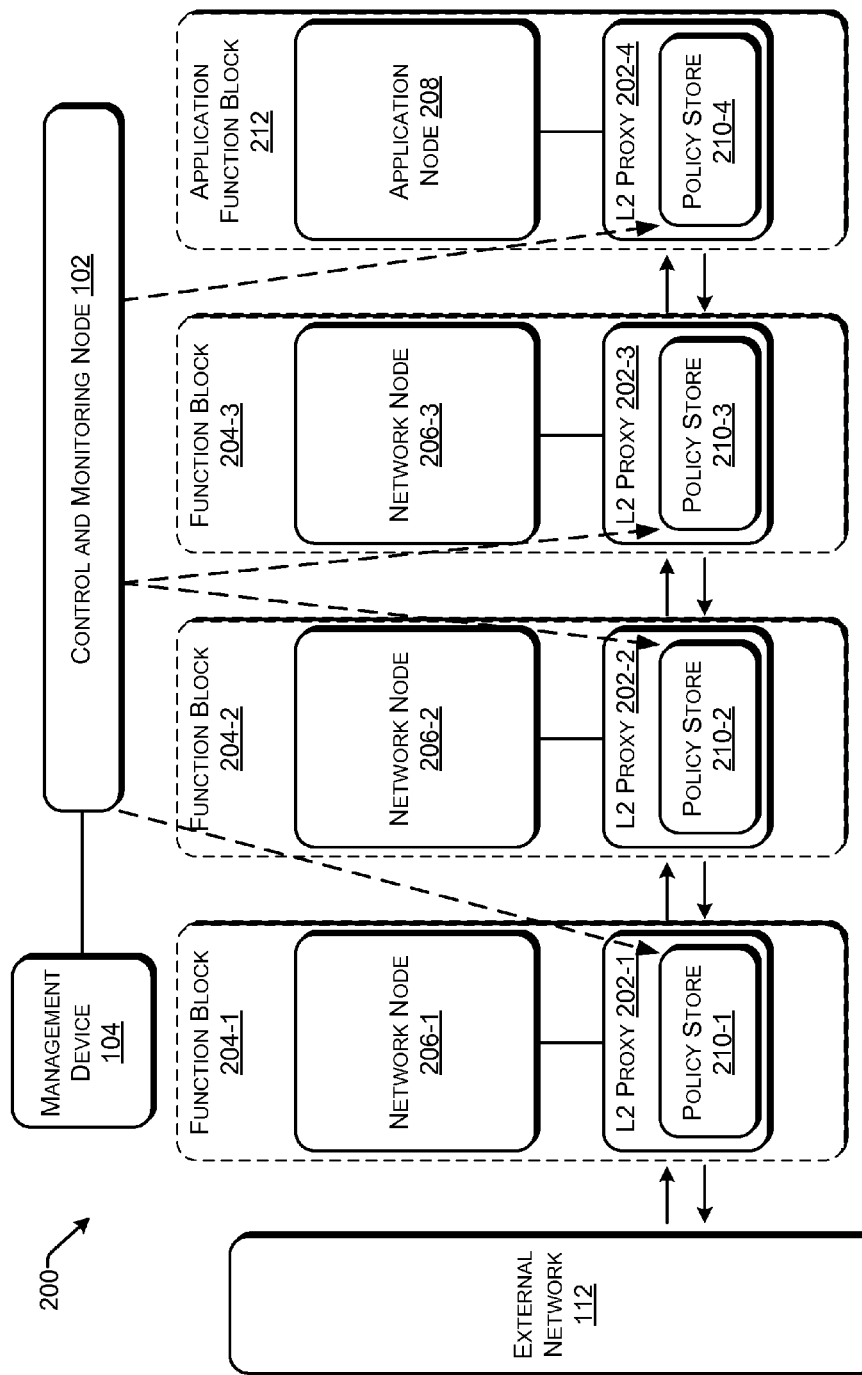
FIG. 2 is a schematic diagram that illustrates an example environment for deploying service chains using policies that are enforced using layer 2 proxies.

FIG. 2 illustrates an environment 200 for deploying service chains using policies that are enforced using layer 2 proxies 202. Environment 200 includes function blocks 204, which include network nodes 206 and application node 208, implanted within an application function block 212. The network nodes 206 may be the same as or similar to the network nodes 106, and the application node 208 may be the same as or similar to the application node 110. Layer 2 proxies 202 may be deployed as separate physical devices within the environment 200, or as virtualized instantiations of virtual networking functions. In some embodiments, the layer 2 proxies may include network switches, such as Ethernet or IEEE 802.1 switches (e.g., MAC address proxies), either as virtualized switches or as physical switches.

There may be a mix of virtualized and physical layer 2 proxies 202 within the environment 200. The control and monitoring node 102 may provide service chain policies, which are stored in policy stores 210 within the layer 2 proxies 202 and/or within the network nodes 206. Ingress and egress data flows through the function blocks 204, via the layer 2 proxies in a same or similar way as is described with respect to FIG. 1. Layer 2 proxies 202 may be used where the network nodes 206 do not have a policy store that is compatible with the control and monitoring node 102, or with other network nodes 206 within the network. Thus, a layer 2 proxy may enable the same policy to be pushed out and enforced at each step in the service chain, even where legacy or incompatible network nodes 206 are utilized within the service chain. Although FIG. 2 is illustrated with each function block 204 having their own layer 2 proxies 202, multiple network nodes 206 may share the same layer 2 proxy, in some embodiments.

In some cases, a policy configuration error may result in an endless traffic loop. Some network protocols, such as IP, utilize a time to live (TTL) field to prevent endless loops. But other protocols, such as various layer 2 protocols, do not natively support loop prevention. One method to prevent endless loops in layer 2 may be to implement a spanning tree protocol. A spanning tree, however, may cut off links in the network, thereby reducing redundancy and otherwise preventing traffic flow. In embodiments, one of the network nodes 106 and 206 of FIGS. 1 and 2, respectively (e.g., the first network nodes in a service chain, although it could be other network nodes in the service chain) may periodically send out health probes to the other network nodes in the service chain. The health probes include an embedded sequence number that is logged and incremented at each hop in the service chain. If a network node 106 or 206 sees the same health probe twice, a loop is detected. In some embodiments, the network nodes 106 and 206 monitor network traffic. If the network nodes see the same traffic twice, a loop may be detected. Some unique identifier in the network traffic is utilized to monitor the traffic. The unique identifier may include a cyclical redundancy check (CRC) within, for example, an Ethernet frame, a sequence number (such as a TCP sequence number), or other identifier. Since some protocols do not include a sequence number, UDP and IPSec being two examples, sequence numbers may not work in all situations.

Next, techniques for highly available service chains are described. When multiple service chains exist for a single application node (or group of application nodes providing the same application to a large group of users), it is useful to make the service chains (and therefore the application nodes) highly available to end users. In conventional networks, it is difficult to load balance the service chains, to determine how the service chains should be deployed, or to determine which service chain data flows should be routed to.

Figure 3:
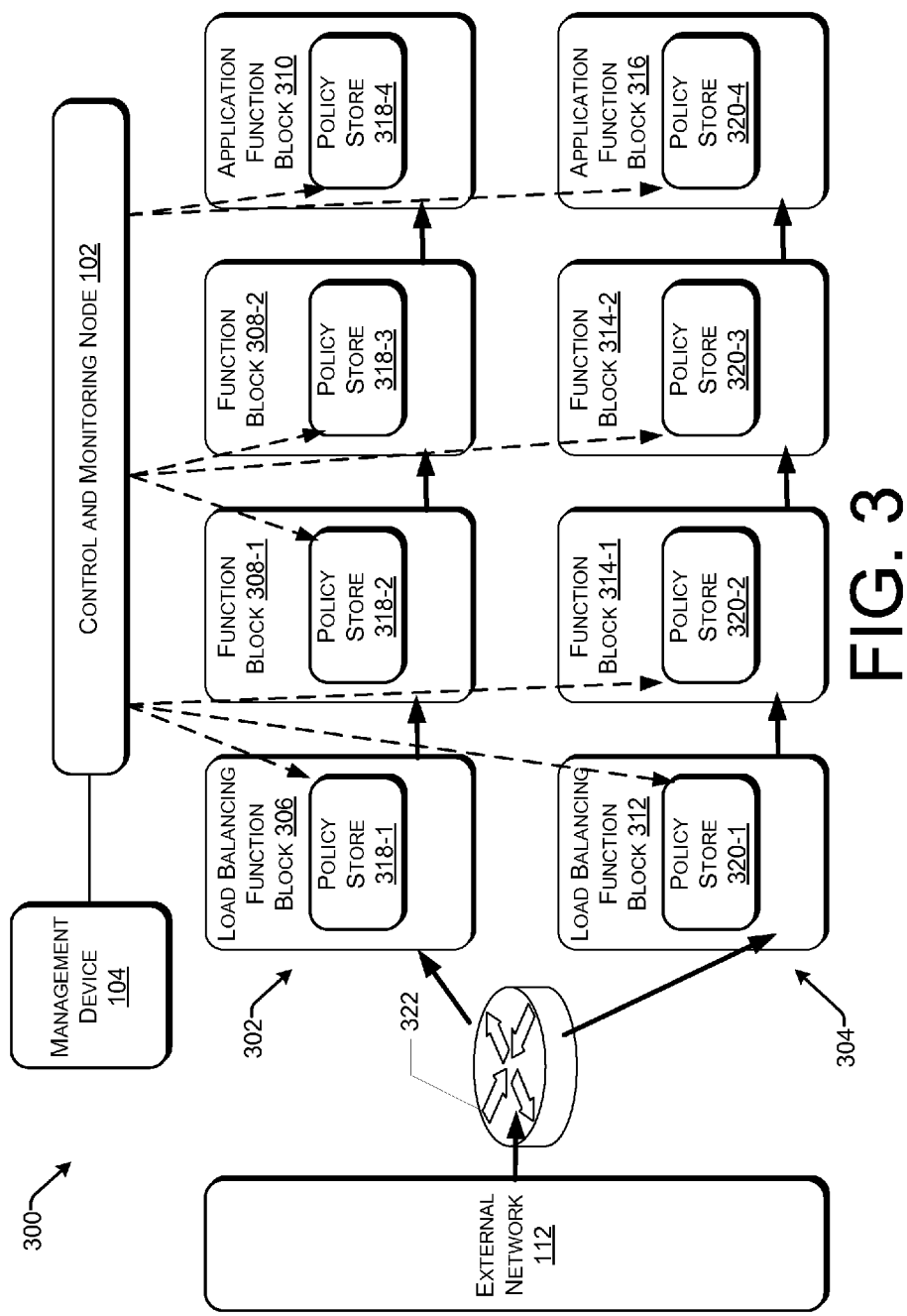
FIG. 3 is a schematic diagram that illustrates an example environment for deploying highly available service chains.

FIG. 3 illustrates an environment 300 for deploying highly available service chains. Environment 300 includes two service chains 302 and 304. Service chain 302 includes load balancing function block 306, function blocks 308, and application function block 310; service chain 304 includes load-balancing function block 312, function blocks 314, and application function block 316 Traffic from the external network 112 originates from client devices; however in some embodiments, the traffic may originate locally within the environment 300, such as within the same datacenter. The control and monitoring node 102 pushes a policy out to the load balancing function blocks 306 and 312, as well as to the function blocks 308 and 314 and the application function blocks 310 and 316. The function blocks 306, 308, 312, and 314 may be the same as or similar to the function blocks 120 and 204 of FIGS. 1 and 2, respectively. And the application function blocks 310 and 316 may be the same as or similar to the application function blocks 122 and 212. The policy is stored in the policy stores 318 and 320.

As ingress traffic arrives at one or more routers 322, the traffic is directed to one of the load balancing function blocks 306 and 312. Directing the traffic to one of the load balancing function blocks 306 and 312 may be based on Domain Name System (DNS) round-robin (e.g., resolving either the end-point IP addresses of the application function blocks 310 and 316 for alternating DNS requests for the same domain name), equal cost multi-path routing (ECMP), or other mechanism. Thus, the traffic flows may be equally balanced between the service chains 302 and 304 (although they do not have to be equally balanced, and some methods may direct more traffic to some service chains than to others).

Similar to FIGS. 1 and 2, the function blocks 306, 308, 312, and 314 forward the data traffic according to the policies provided by the control and monitoring node 102, until the traffic reaches the application function blocks 310 and 316. The control and monitoring node 102 also monitors the performance and traffic flows through each of the service chains 302 and 304.

Although FIG. 3 is illustrated with two service chains 302 and 304, these and other embodiments are not limited to only two service chains; embodiments may scale to N service chains, where N is an integer. Also, the application function blocks 310 and 316 may receive traffic flows through more than one service chain without departing from the scope of embodiments.

Figure 4:
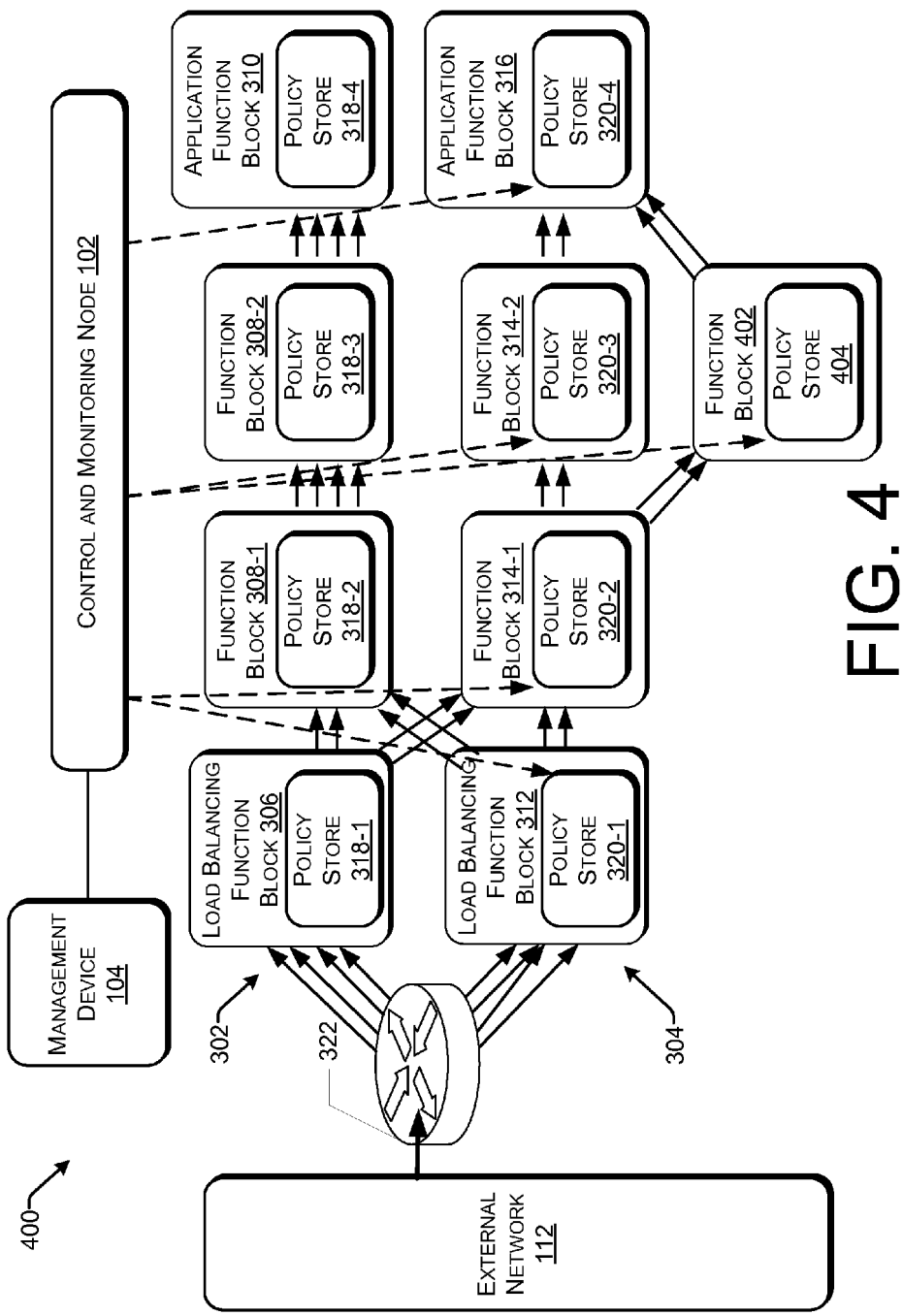
FIG. 4 is a schematic diagram that illustrates an example environment for load balancing ingress traffic through service chains.

FIG. 4 illustrates an environment 400 for load balancing ingress traffic through service chains. The control and monitoring node 102 monitors the performance of the service chains 302 and 304. For example, logging systems, such as logging systems 118, in the function blocks of the service chains may report resource utilization and/or performance information to the control and monitoring node 102. Upon detecting that a function block, such as the function block 314-2, experiences a heavy load—such as heavy computing resource utilization, including CPU utilization, memory utilization, bandwidth load, and so forth—the control and monitoring node 102 determines that the function block is a bottleneck in the service chain. The control and monitoring node determines to instantiate a new function block 402 having policy store 404. The new function block 402 performs the same function as the function block 314-2. For example, where the function block 314-2 is an anti-virus function block, the new function block 402 is also an anti-virus function block.

The control and monitoring node 102 updates the policies stored on the policy stores 320 to route some of the traffic in service chain 304 through the function block 402, and to leave some of the traffic in service chain to pass through the function block 314-2. For example, the function block 314-1 may determine to provide data to the function block 314-2 and to the function block 402 in a round-robin fashion, based on some identifier, or based on some other information, as determined by the policy stored in its policy store 320-2. In one example, source IP addresses may be utilized to determine packets that flow to either the function block 314-2 or to the function block 402. The policies are determined to avoid data loops, as well as to ensure that the function blocks 320 are proceeded through in the chain in the proper order and that no function block types are skipped.

In the example illustrated in FIG. 4, the function block 402 provides additional capacity to service chain 304. But in some embodiments, a newly instantiated function block—such as function block 402, may provide additional capacity to multiple service chains. To do so, the control and monitoring node 102 may update the policy stores 318, in addition to policy stores 320, to effectuate the provision of the function block 402 for both service chains 302 and 304.

In some embodiments, the load balancing function blocks 306 and 312 may determine a routing policy, either based on the policy provided by the control and monitoring node 102, or based on locally determined real-time data that indicates that performance of the service chain has degraded in one or more measurable ways based on one or more predetermined performance thresholds. In one example, the load-balancing function blocks 306 and 312 may have policies that enable them, upon detecting performance degradation or based on updated policies from the control and monitoring node 102, to begin routing some traffic to the other service chain (e.g., from load balancing function block 306 to the function block 314-1).

In some embodiments, the policy provided by the control and monitoring node 102 may provide load balancing functionality, and therefore eliminate the need for the load balancing function blocks 306 and 312. The policy may provide for the traffic to be distributed across a graph of function blocks, forming a dynamic service chain. This could be achieved in various ways. In some embodiments, the policies provided by the control and monitoring node 102 instructs the function blocks 308, 314, and 402 to direct traffic to one of a plurality of possible next-hop function blocks (for example in a round-robin fashion, or based on other information such as source IP address, protocol information, and so forth). In some embodiments, the function blocks 308, 314, and 402 employ a spreading protocol such as ECMP to make a next-hop determination on a per-flow basis.

In some embodiments, a routing policy may be based on per-flow Markov chains. The function blocks 308, 314, and 402 that are configured to use per-flow Markov chains may apply routing decisions for each initial packet of a flow through the set of service chains. The policies provided by the control and monitoring node 102 directs the function blocks to weight the probability of a possible next hop based on performance metrics of the service chain, in some embodiments. As an individual function block 308, 314, and 402 reaches a performance threshold, including but not limited to a forwarding queue threshold, its probability of selection for a next hop may approach or be set to zero.

Each function block may store flow information. This enables the function blocks 308, 314, and 402 to treat all packets in a single flow the same, such that all packets in a single data flow are forwarded to the same next-hops in the service chains 302 and 304; doing so may enable the service chains 302 and 304 to maintain continuity. For example, a firewall function block may be configured to inspect all packets in a single flow and a packet sent to another firewall function block instead may "break" the flow, causing an outage, errors, dropped packets, etc.

Figure 5:
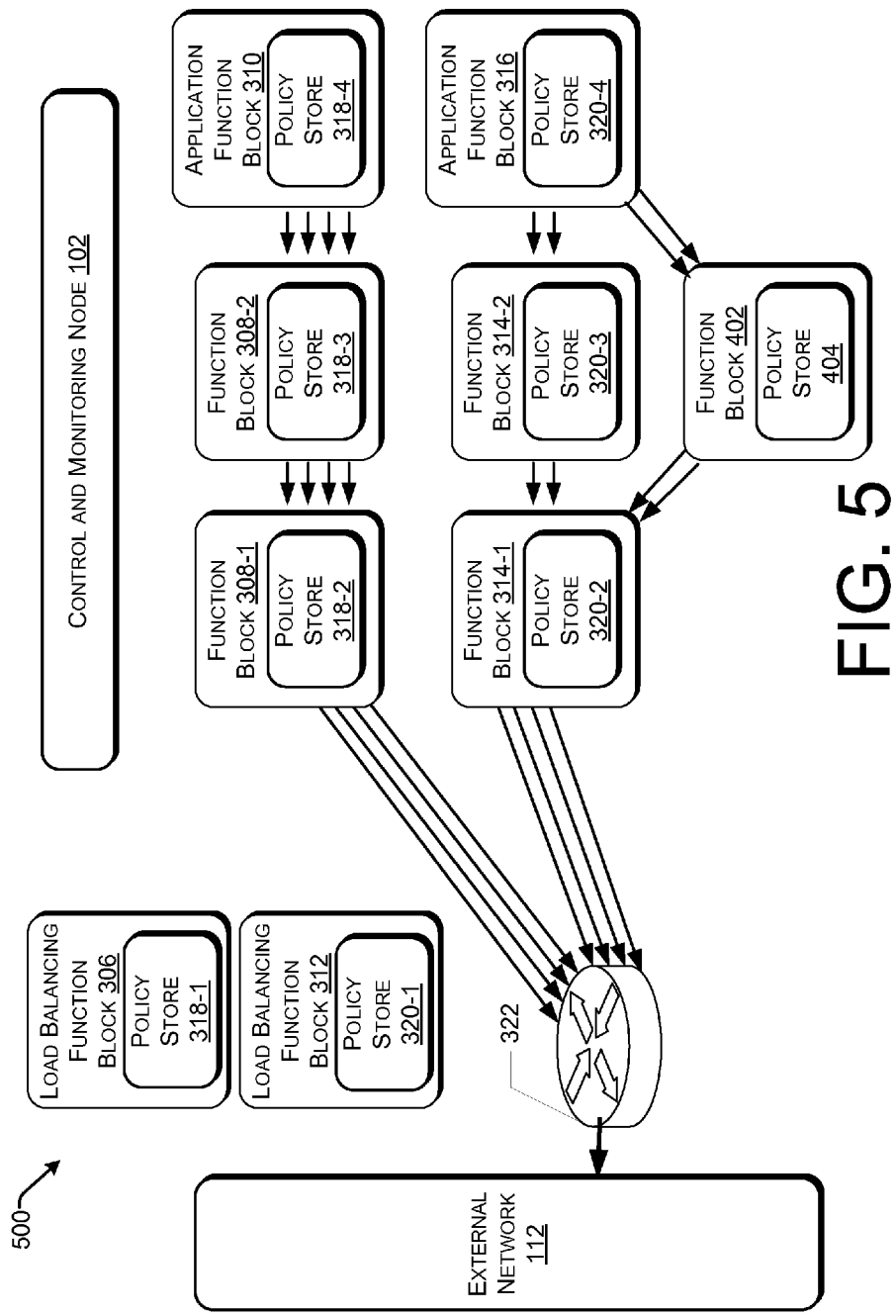
FIG. 5 is a schematic diagram that illustrates an example environment for load balancing egress traffic service chains.

FIG. 5 illustrates an environment 500 for load balancing egress traffic service chains. The environment 500 builds on the example in FIG. 4, which illustrates ingress traffic load balancing. As noted above, some function blocks only process ingress traffic, while others may process only egress traffic in a particular service chain. And some function blocks scan both ingress and egress data (e.g., bidirectional data). As described with respect to FIG. 1, the control and monitoring node 102 builds an egress (and ingress) policy based at least in part on registration data provided by the function blocks, including the advertised or detected capabilities of the function blocks. The policy orders the flow of data in the service chain in the egress direction. As new applications are deployed in the environment 500, and as applications are brought off line, the configuring of the service chains is a dynamic process. Each application has one or more service chains associated with it.

As noted above in the description of FIG. 4, function block 402 may be deployed based on performance load of the function block 314-2. Thus, where the control and monitoring node 102 updates policies to begin routing some traffic through the function block 402, the policies may specify both ingress and egress traffic is to pass through the function block 402. As noted elsewhere within this Detailed Description, some function blocks may be skipped in the egress direction, and thus the provision or instantiation of a new function block may not always result in an update to egress traffic flow.

The same routing policies that apply to ingress traffic flow may also apply to egress traffic flow. For example, the policies provided by the control and monitoring node may provide for the traffic to be distributed in the egress direction across a graph of function blocks, forming a dynamic service chain. In some embodiments, the policies provided by the control and monitoring node 102 directs the function blocks to forward traffic to one of a plurality of possible next-hop function blocks in the egress direction; the function blocks 308, 314, and 402 employ a spreading protocol such as ECMP to make a next-hop determination on a per-flow basis in the egress direction; the function blocks 308, 314, and 402 may employ per-flow Markov chains. Thus, in some embodiments, ingress and egress traffic flow is not symmetrical. On the other hand, in some embodiments, egress traffic associated with a single traffic flow may be directed to the same function blocks as were used for ingress traffic to maintain function block continuity and symmetry of traffic flow in both the ingress and egress directions.

As with the ingress traffic flow, each function block 308, 314, and 402 may store flow information; this may enable the function blocks to treat all packets in a single flow the same, such that all packets in a single data flow move on to the same next-hops in the egress directions.

As noted above, when a service chain is under heavy load, it may benefit from more throughput at function blocks of a certain type (e.g., at the function block 314-2 of FIGS. 4 and 5.) To determine whether to deploy a new function block into a service chain, the control and monitoring node 102 may determine from various factors, such as based on network topology, historical network utilization at similar times (time of day, time of week, time of month, quarterly, time of year, every Nth year for events that occur every Nth year, and so forth), and real-time utilization and performance information, and determine whether to deploy additional function blocks within the service chain.

If the control and monitoring node 102 determines that more bandwidth is needed at the load balancing function nodes 306 and 312, then the control and monitoring node 102 updates the policies, deploys the policies to the function blocks, and causes new load balancing function blocks to be deployed. Similarly, where the control and monitoring node 102 determines that less bandwidth is needed at the load balancing function nodes 306 and 312, the control and monitoring node 102 may decommission one of the load balancing function nodes 306 and 312, update the policies, and deploy the new policies to route traffic through a smaller number of load balancing function nodes.

Similarly, the control and monitoring node 102 may determine that entirely new service chains, which may include new application function blocks, are to be instantiated (such as based on network topology, historical utilization, and real-time data). In these instances, the control and monitoring node 102 may cause the instantiation of the new function blocks and/or new application function blocks for a new service chain. This may include generating policies, providing the new policies to the newly instantiated function blocks and/or to the newly instantiated application function blocks, and so forth.

Figure 6:
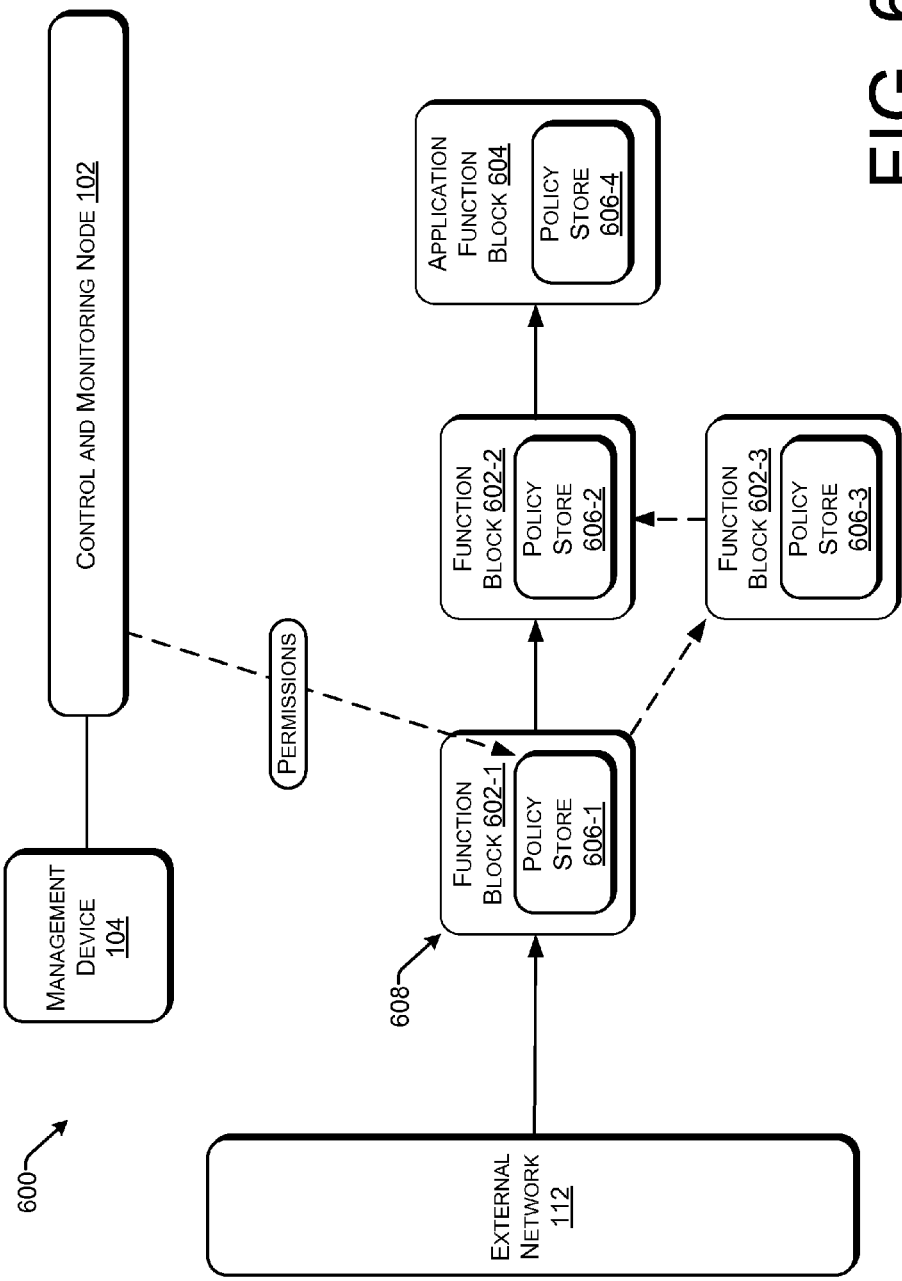
FIG. 6 is a schematic diagram that illustrates an example environment for a function block to redirect traffic to a different function block in a service chain.

FIG. 6 illustrates an environment 600 for a function block to redirect traffic to a different function block in a service chain. Function blocks 602 may be the same as or similar to the function blocks 120, 204, 306, 308, 312, 314, and 402. And application function block 604 may be the same as or similar to application function blocks 122, 212, 310, and 316. The control and monitoring node 102, as previously discussed, provides policies that are stored in policy stores 606. In an initial configuration of the policy, the service chain 608 directs traffic from function block 602-1 to 602-2, and then to application function block 604. The policy provided to the function blocks includes permissions to redirect some traffic to other function blocks in some embodiments. In the example illustrated in FIG. 6, function block 602-1 is permitted to redirect a data flow to function block 602-3, based for example on the results of the inspection of the data packets in the data flow. In one example, the function block 602-1 is a firewall function block that determines based on inspection of packets in a data flow, to route traffic in the data flow to a deep packet inspection engine (e.g., function block 602-3) for more careful analysis of packets in the data flow. If the function block 602-1 is permitted to make this change—based for example on the policy provided by the control and monitoring node 102—then the function block 602-1 updates the next hop address for the data flow (or requests that the control and monitoring node 102 update the policy). The function block 602-3 may be already instantiated, or may be instantiated based on the determination to route traffic to it. The function block 602-3 is provided with a policy. In some embodiments, the egress traffic may also be updated, such as by the control and monitoring node 102.

Each function block may store flow information; this enables the function blocks 602 to treat all packets in a single flow the same, such that all packets in a single data flow are forwarded to the same next-hops in the service chain 608. Thus, once the function block 602-1 decides to route traffic for a particular data flow to the function block 602-3, all subsequent packets associated with that data flow are directed to the function block 602-3. Packets associated with other data flows may continue to be forwarded from function block 602-1 to function block 602-2.

In addition to permitting the function blocks 602 to redirect traffic for some or all flows to a different function block 602, policies according to embodiments may enable function blocks to redirect traffic to entirely different service chains. An example of this is discussed with respect to FIG. 4, where load balancing function blocks 306 and 312 direct some data flows to other service chains based on service chain performance, service chain utilization, and so forth. But other examples are also possible. For example, a service block may determine that some flows should be subject to heightened scrutiny, and the flows therefore directed to another service chain that provides a higher level of security. Thus, a relatively faster service chain may be utilized for traffic as a baseline or default, with more suspect traffic given to a relatively more secure chain based on results of packet inspection or based on other information. In another example, some traffic determined to be suspect may be dropped altogether (e.g., the policy updated to include no next hop), or redirected into a service chain to leads to a honeypot, a testbed, or to another alternative application function block.

Figure 7:
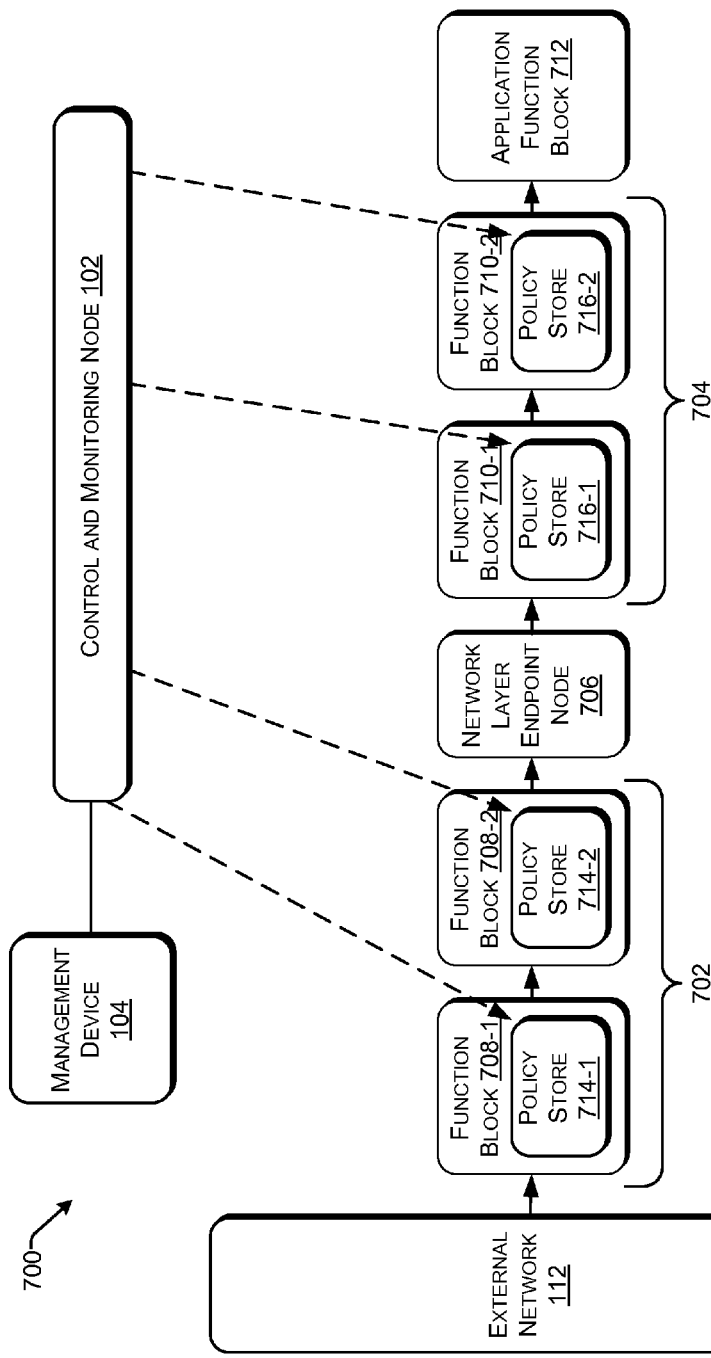

FIG. 7 illustrates an environment 700 in which multiple service chains 702 and 704 are chained together with a network layer endpoint node 706 in between. In the example illustrated in FIG. 7, the function blocks 708 of the service chain 702, and the function blocks 710 of the service chain 704, are data link layer (e.g. MAC layer) service chains, such that the policies that define the service chains 702 and 704 are based on next-hop data link layer addresses (e.g., MAC layer addresses). The network layer endpoint node 706 may be an IP endpoint node, or other network layer endpoint node type, and is itself a destination for ingress traffic from the external network 112. Examples of network layer endpoints 706 include, among other things, a VPN server, an IP tunneling gateway, a proxy server, a network-layer firewall (e.g., a proxy firewall), and so forth. The network layer endpoint 706 may be an application function block, such as a file server node, a web server node, a database node, an email server, and so forth.

Service chain 704 couples network layer endpoint node 706 to application function block 712. The control and monitoring node 102 provides policies to the policy stores 714 and 716. The policies for each of the service chains 702 and 704 may be different from one another. One or both of the service chains 702 and 704 may be provided with high availability features, such as load balancing, routing policies, instantiation of new function blocks, redirection of traffic to new function blocks based on packet inspection (as in FIG. 6), and so forth as described elsewhere within this Detailed Description.

In various examples, the network layer endpoint node 706 may be a web server node, while the application function block 712 may be a back-end database server node. The back-end database server node may be provided by a different entity than the web server node, as part of an arms-length relationship, and thus it would be useful to protect data flows between the two nodes. The network layer endpoint node 706 may include a VPN node function, that terminates VPN connections with client devices via the external network 112, and the application function block 712 may include application functions to the client devices. Other examples are possible without departing from the scope of embodiments.

Figure 8:
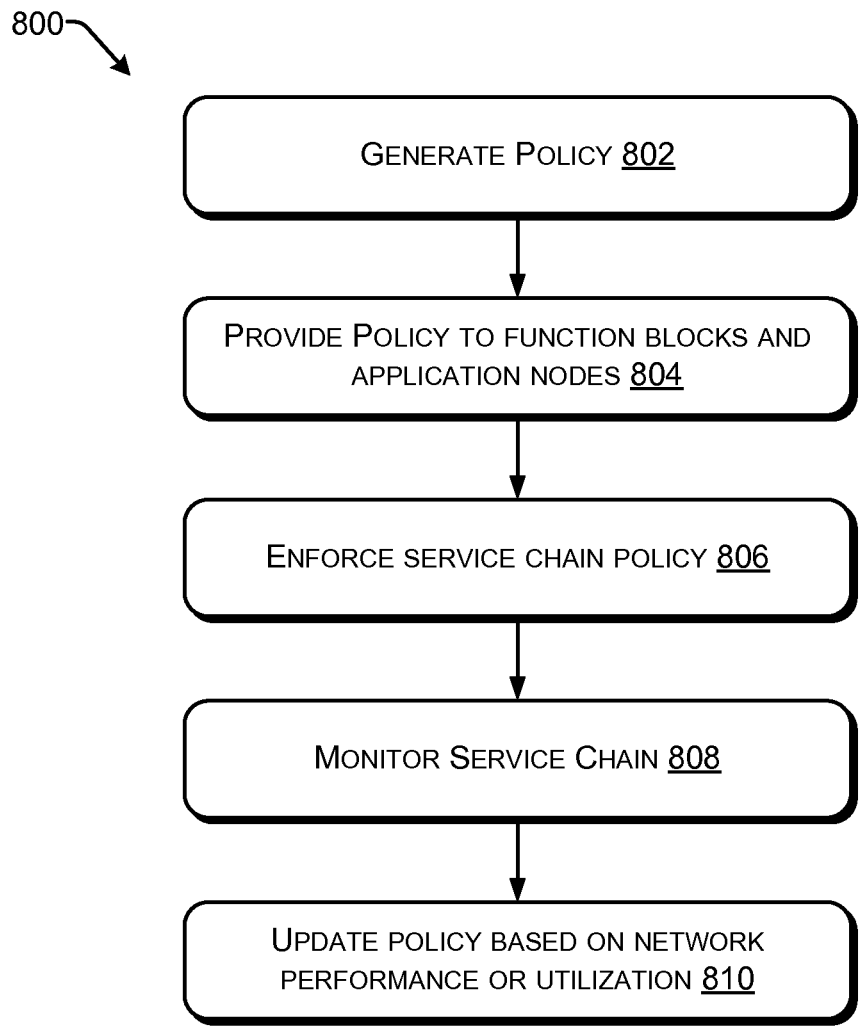
FIG. 8 is a flow diagram that illustrates an example process for providing a service chain.

FIG. 8 depicts a flow diagram that shows an example process in accordance with various embodiments. The operations of this process are illustrated in individual blocks and summarized with reference to those blocks. This process is illustrated as a logical flow graph, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

FIG. 8 illustrates an example process 800 for providing a service chain. At 802, a control and monitoring node 102 generates a service chain policy, based on intelligence and information—such as computing and network resource utilization, network or server outages and faults, historical resource utilization data, and so forth—gathered in the network by the control and monitoring node 102. The service chain policies indicate the function blocks—which generally include network nodes, application nodes, and the like—that are included within a service chain. The service chain policy also orders the function blocks within the service chain. The service chain policy provides, in some embodiments, both ingress and egress traffic flow through the service chain. The service chain policy provides additional information, in some embodiments, such as permission for the function blocks to alter the policy, standardized software and hardware to be used for function blocks, and so forth.

At 804, the control and monitoring node 102 provides the policy to function blocks in a service chain. The control and monitoring node may also provide the policy to one or more application function blocks.

At 806, the function blocks, and possibly the application function blocks, enforce the policy. Enforcing the policy includes, in some embodiments, selecting next-hop addresses based on the policy. The policy may be enforced by one or more of network nodes within the function blocks, or by layer 2 proxies within the function blocks.

At 808, one or more of the control and monitoring node, the function blocks, or the application function blocks monitors the service chain. The function blocks and/or the application function blocks may log utilization data, performance data, and so forth. The utilization data and performance data may include, in some embodiments, one or more of CPU utilization, memory utilization, network bandwidth utilization, an amount of time it takes for a data packet to traverse the service chain, and so forth. The function blocks and/or the application function blocks, may provide this information to the control and monitoring node, or to one or more function blocks or application function blocks. The control and monitoring node may also monitor the function blocks and application function blocks to determine that they are operational, and have not suffered an outage.

At 810, one of the control and monitoring node, the function blocks, or the application function block may update the policy based on the monitored data. In some embodiments, this policy update may account for additional datacenter events that impact capacity in the network such as maintenance (planned or otherwise) and other events. In some embodiments, a new function block may be instantiated at a certain location in the service chain where the function block at that certain location suffers an outage or experiences high load. In some embodiments, the updated policy may cause load balancing to be initiated or altered within the service chain, or within multiple service chains. In some embodiments, as described elsewhere within this Detailed Description, the updated policy may redirect one or more traffic flows to a function block not present in the original service chain (such as is described with respect to FIG. 6). In some embodiments, the updated policy may redirect traffic flow to an entirely new service chain, such as for load balancing purposes, or for other reasons, such as for security reasons. Other examples are possible without departing from the scope of embodiments.

Figure 9:
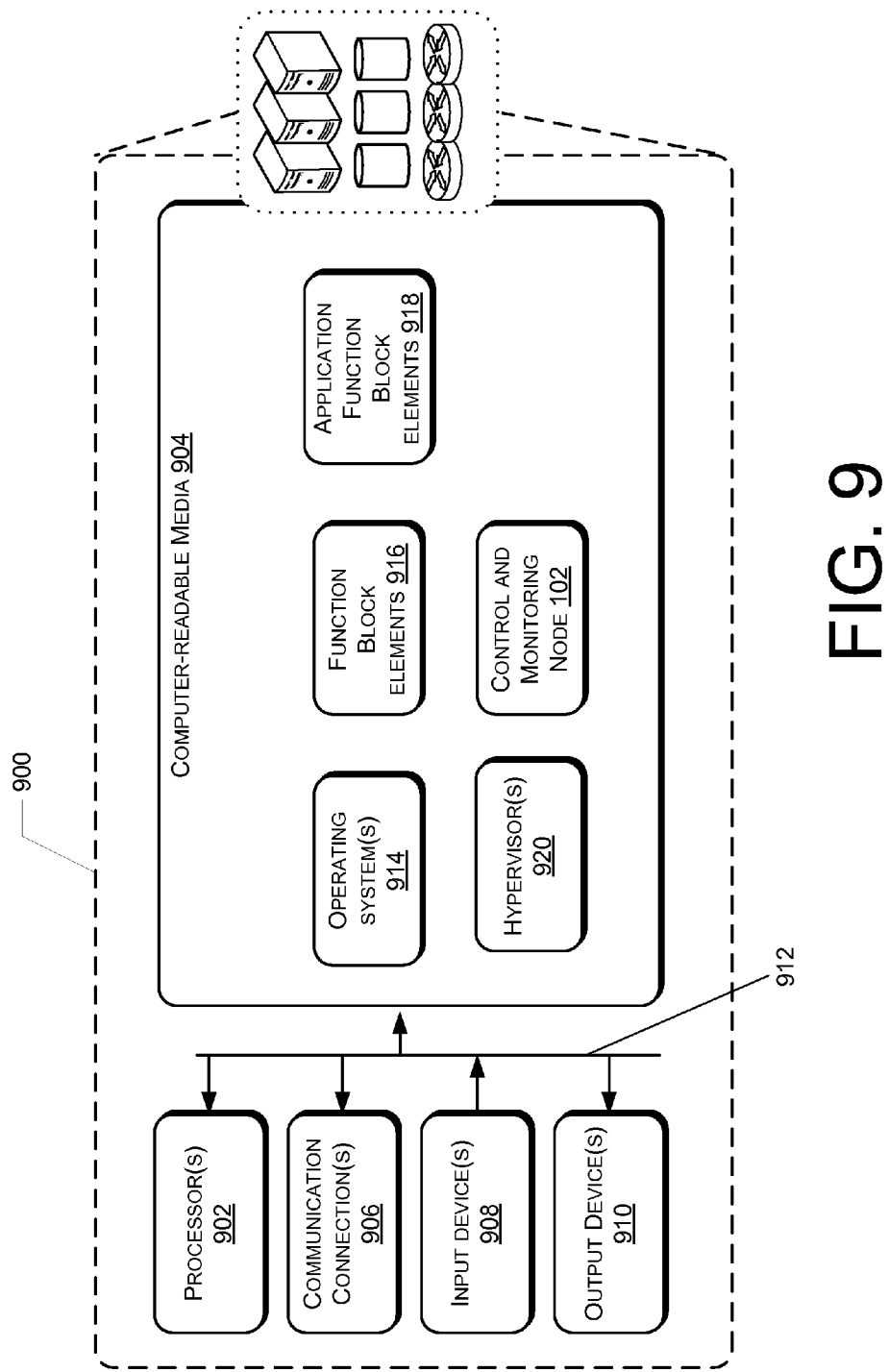
FIG. 9 is a block diagram of an example computing system usable to implement a service chain according to various embodiments of the present disclosure.

FIG. 9 is a block diagram of an example computing system 900 usable to implement a service chain according to various embodiments of the present disclosure. Computing system 900 may be deployed in a shared network environment, including in a datacenter, a cloud computing environment, or other network of computing devices. According to various non-limiting examples, the computing system 900 includes one or more devices, such as servers, storage devices, and networking equipment. In one example configuration, the computing system 900 comprises at least one processor 902. The computing system 900 also contains communication connection(s) 906 that allow communications with various other systems. The computing system 900 also includes one or more input devices 908, such as a keyboard, mouse, pen, voice input device, touch input device, etc., and one or more output devices 910, such as a display (including a touch-screen display), speakers, printer, etc. coupled communicatively to the processor(s) 902 and the computer-readable media 904 via connections 912.

The computer-readable media 904 stores computer-executable instructions that are loadable and executable on the processor(s) 902, as well as data generated during execution of, and/or usable in conjunction with, these programs. In the illustrated example, computer-readable media 904 stores operating systems 914, which provide basic system functionality to the function block elements 916, application function block elements 918, and the control and monitoring node 102. One or more of the operating system instances 914, one or more of the function block elements 916, and one or more of the application function block elements 918 may be instantiated as virtual machines under one or more hypervisors 920.

The function block elements 916 may implement software functionality of one or more of the function blocks 120, 204, 306, 308, 312, 314, 402, 602, 708, and 710 as described elsewhere within this Detailed Description, including network nodes, logging systems, policy stores, function elements, protocol stacks, layer 2 proxies, and so forth. The application function block elements 918 may implement software functionality of one or more of the application function blocks, such as application function blocks 122, 212, 310, 316, 604, and 712 as described elsewhere within this Detailed Description, including logging systems, policy stores, function elements, protocol stacks, layer 2 proxies, and so forth.

Processor(s) 902 may be or include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative embodiments one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, embodiments of the computing system 900 may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media 904 include volatile memory (such as random access memory (RAM)) and/or non-volatile memory (such as read-only memory (ROM), flash memory, etc.). The computer-readable media 904 can also include additional removable storage and/or non-removable storage including, but not limited to, SSD (e.g., flash memory), HDD storage or other type of magnetic storage, optical storage, and/or other storage that can provide non-volatile storage of computer-executable instructions, data structures, program modules, and other data for computing system 900.

Computer-readable media 904 can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Figure 10:
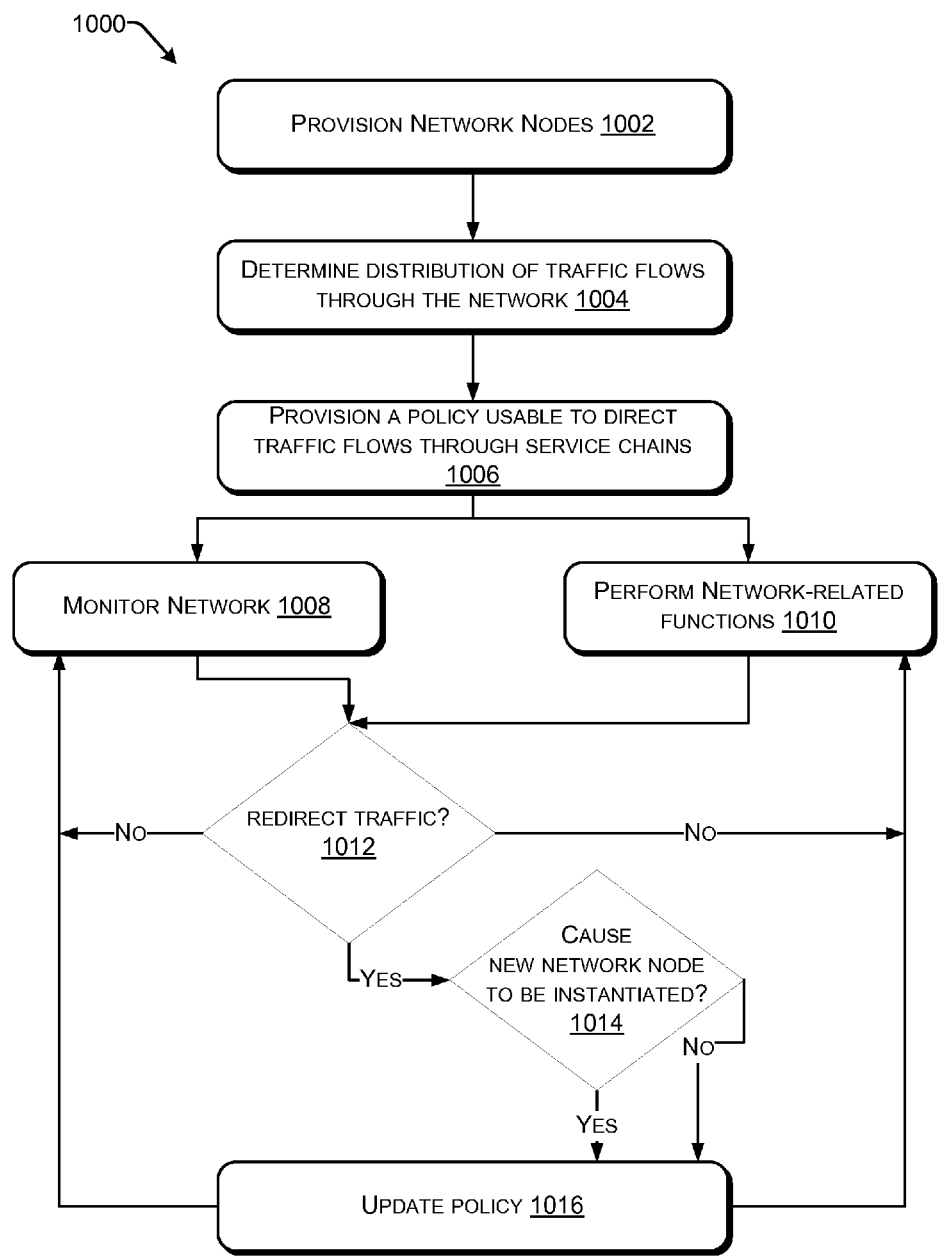
FIG. 10 illustrates an example process for providing highly available service chains.

FIG. 10 depicts a flow diagram that shows an example process in accordance with various embodiments. The operations of this process are illustrated in individual blocks and summarized with reference to those blocks. This process is illustrated as a logical flow graph, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

FIG. 10 illustrates an example process 1000 for providing highly available service chains. At 1002, a computing system provisions a plurality of function blocks, including a plurality of network nodes, such as the function blocks 120, 122, 204, 212, 306, 308, 310, 312, 314, 316, and 602. The network nodes of the function blocks having function elements (such as function elements 116) that provide corresponding network-related functions.

At 1004, the computing system (e.g., a control and monitoring node, a network node, an application node, or other computing system component) determines a distribution of a plurality of traffic flows, both ingress and egress, amongst the plurality of network nodes. This includes identifying, such as perhaps by a load-balancing function block or a control and monitoring node, a subset of the plurality of network nodes to be included in a particular service chain of a plurality of service chains to be used for a particular traffic flow. Determining the distribution may be initiated by receiving first packet or other data transmission unit for a traffic flows. The distribution may be determined based on network performance information, real-time and/or historical performance information. The performance information may include network utilization data, network bandwidth data, and computing resource information, such as memory utilization data, processor utilization data, and so forth. The distribution may be based on source information of the traffic flow, such as based on source IP address, protocol information, or other information related to a source of the traffic flow. The distribution may be based on destination information, such as a destination layer 2 address, destination layer 3 address, destination port (e.g., TCP port) information, and so forth. Distributing the traffic flows may be based on a load-balancing scheme, such as round-robin, Markov weights based on performance information, etc. Other information may be used to determine the distribution.

At 1006, the computing system (e.g., a control and monitoring node, a network node, an application node, or other computing system component) provisions a policy that is usable by the subset of the plurality of network nodes to direct the particular traffic flow through the particular service chain. The policy indicates the subset of the plurality of network nodes to be included in a particular service chain and a data flow order through the subset of the plurality of network nodes. Provisioning a plurality of policies for the plurality of service chains implements the distribution of traffic flows through the network.

At 1008, the computing system monitors the network. This may include, in various embodiments, monitoring network performance information, such as real-time and/or historical performance information. The performance information may include network utilization data, network bandwidth data, and computing resource information such as memory utilization data, processor utilization data, and so forth. Monitoring may include, in various embodiments, monitoring function blocks, including one or more network nodes and application nodes, for failure. The monitoring may include, in various embodiments, logging systems (e.g., the logging systems 118) providing information to a control and monitoring node, a load-balancing node, an application node, or other element of the computing system. The control and monitoring node or other element receives the performance information and may maintain a network-wide view of the network topology and performance.

At 1010, the network nodes in the network perform their various network-related functions, such as firewall function, anti-virus function, and so forth. The various network-related functions may include packet and/or data inspection functions as provided by function elements of the function blocks. In some embodiments, the policy permits one or more network nodes of a service chain to update the policy for the service chain to redirect traffic flow through at least another network node, not included in the particular service chain. The redirect may be based on inspection of packets of the traffic flow by the network node according to its particular network-related function. For example, a firewall network node may be enabled, based on inspecting network traffic, to redirect suspect traffic to a deep packet inspection network node, or to redirect the traffic to a different service chain entirely.

At 1012, based for example on results of the network monitoring and/or results of the network-related functions of the network nodes, the computing system determines whether to redirect traffic. Determining to redirect traffic may be based on one or more performance thresholds being met or exceeded, such as threshold related to network utilization, computing resource utilization, and so forth. In one example, exceeding a processor utilization threshold, such as 70% processor utilization in a network node, may result in some traffic flows being redirected to other network nodes and/or to other service chains.

At 1014 (the "Yes" path), the computing system determines whether a new network node is to be instantiated. This determination may be based for example on performance data, such as real-time and/or historical performance data. For example, where historical performance data indicates that network utilization may increase at a certain type of network node, a new network node of that type may be instantiated. Similarly, where real-time data indicates that all network nodes of a certain type are near to, meet, or exceed a performance threshold, a new network node of that type may be instantiated. Where sufficient resources are available at network nodes already substantiated, the computing system may determine not to instantiate a new network node.

At 1016 (the "Yes" path), the computing system causes a network node to be instantiated. The computing system at 1018 updates the policy. Updating the policy includes, in some embodiments, distributing the updated policy to some or all of the function blocks in the network. The updated policy may indicate to forward some or all traffic flows to a newly instantiated network node, to an existing network node, to an entirely new service chain, and so forth.

EXAMPLE CLAUSES

Example A

A computing system to provide a plurality of service chains, the computing system comprising one or more processors; memory; and a plurality of programming instructions stored on the memory and executable by the one or more processors to perform actions including: identifying a subset of a plurality of network nodes to be included in a particular service chain of the plurality of service chains to be used for a particular traffic flow of a plurality of traffic flows, the particular traffic flow associated with an application node; defining a policy indicating the subset of plurality of network nodes and an order of the particular traffic flow associated with the application node through the subset of the plurality of network nodes of the particular service chain; distributing the policy to the subset of the plurality of network nodes; enforcing the policy to direct the particular traffic flow through the particular service chain, the policy indicating the subset of the plurality of network nodes to be included in the particular service chain, the policy further indicating a data flow order through the subset of the plurality of network nodes; monitoring a plurality of network nodes, each network node of the plurality of network nodes providing corresponding network-related functions; and in response to the monitoring, updating the policy and redistributing the policy, once the policy is updated, to the subset of the plurality of network nodes.

Example B

The computing system of example A, wherein identifying the subset of the plurality of network nodes further comprises identifying the subset of the plurality of network nodes to be included in the particular service chain based at least on performance information associated with the plurality of network nodes or service availability information associated with the plurality of network nodes.

Example C

The computing system of either of examples A or B, wherein the actions further include instantiating a new network node; and further updating the policy to direct the particular traffic flow through at least the new network node.

Example D

The computing system of example C, wherein the actions further include determining to instantiate the new network node based at least on performance information associated with the subset of the plurality of network nodes or service availability information associated with the plurality of network nodes.

Example E

The computing system of example D, wherein the performance information is selected from the group consisting of historical network utilization and real-time network utilization.

Example F

The computing system of example C, wherein the actions further include determining to instantiate the new network node based at least on failure of at least one of the subset of the plurality of network nodes.

Example G

The computing system of any of examples A through F, wherein the actions further include identifying the subset of the plurality of network nodes to be included in the particular service chain based at least on load-balancing the plurality of traffic flows amongst the plurality of network nodes.

Example H

The computing system of example G, wherein the policy indicates corresponding next-hop node addresses that are selected from a group consisting of layer 2 next-hop addresses, layer 3 next-hop addresses, and a combination of layer 2 next-hop addresses and layer 3 next-hop addresses.

Example I

The computing system of any of examples A through H, wherein each network node in the service chain has an ability to distribute the traffic flows across one or more next hops.

Example J

The computing system of any of examples A through I, wherein the actions further include distributing the plurality of traffic flows amongst of the plurality of network nodes based at least in part on weights for each of the plurality of network nodes, the actions further comprising determining the weights based at least on performance information for each of the plurality of network nodes.

Example K

The computing system of any of examples A through J, wherein the actions further comprise inspecting one or more packets of the particular traffic flow, the inspection carried out by a particular network node according to a particular network-related function of the particular network node; and further updating, by the particular network node, the policy to redirect the particular traffic flow through at least another network node, the redirect based at least in part on the inspecting, the policy indicating that the particular network node of the subset of the plurality of network nodes of the particular service chain is permitted to update the policy based on the inspecting.

Example L

A method, comprising: identifying a subset of a plurality of network nodes to be included in a particular service chain of a plurality of service chains, the particular service chain for a particular traffic flow associated with an application node, each network node of the plurality of network nodes providing corresponding network-related functions, the particular traffic flow being one of a plurality of traffic flows; defining a policy indicating the subset of the plurality of network nodes and an order of the particular traffic flow associated with the application node through the subset of the plurality of network nodes; distributing the policy to the subset of the plurality of network nodes; monitoring capacity information associated with one or more of the plurality of network nodes; and in response to the monitoring, updating the policy and redistributing the policy, once updated, to at least the subset of the plurality of network nodes.

Example M

The method of example L, wherein the capacity information includes information selected from the group consisting of historical network utilization and real-time network utilization.

Example N

The method of either of examples L or M, further comprising: causing, based at least on the capacity information, a new network node to be instantiated; and wherein the updating includes updating the policy to direct the particular traffic flow through at least the new network node.

Example O

The method of any of examples L through N, wherein the updating includes updating the policy based at least on load-balancing the plurality of traffic flows.

Example P

The method of any of examples L through O, wherein the updating includes updating the policy to indicate that a particular network node of the subset of the plurality of network nodes is enabled to change the policy to redirect the particular traffic flow through at least another network node, the redirect based at least on a packet inspection performed by the particular network node according to a particular network-related function provided by the particular network node.

Example Q

A computing system including: one or more processors; memory; and programming instructions stored on the memory and executable by the one or more processors to perform actions including: identifying a subset of a plurality of network nodes to be included in a particular service chain of a plurality of service chains, the particular service chain for a particular traffic flow associated with an application node, each network node of the plurality of network nodes providing corresponding network-related functions, the particular traffic flow being one of a plurality of traffic flows; defining a policy indicating the subset of the plurality of network nodes and an order of the particular traffic flow associated with the application node through the subset of the plurality of network nodes; distributing the policy to the subset of the plurality of network nodes; monitoring capacity information associated with one or more of the plurality of network nodes; and in response to the monitoring, updating the policy and redistributing the policy, once updated, to at least the subset of the plurality of network nodes.

Example R

The computing system of example Q, wherein the actions further include causing a new network node to be instantiated, and wherein the updating includes updating the policy to direct the particular traffic flow to redirect through at least the new network node.

Example S

The computing system of either of examples Q or R, wherein the actions further include further updating the policy based on a failure of one or more of the subset of the plurality of network nodes.

Example T

The computing system of claim 17, wherein: a particular network node of the plurality of network nodes is configured to perform a security-related function on one or more packets of the particular traffic flow; and the actions further include further updating the policy, based at least on inspection by the particular network node of the one or more packets in accordance with the security-related function, to redirect the particular traffic flow from at least a first network node to at least a second network node.

Example U

A computing system to provide a plurality of service chains, the computing system comprising means for identifying a subset of a plurality of network nodes to be included in a particular service chain of the plurality of service chains to be used for a particular traffic flow of a plurality of traffic flows, the particular traffic flow associated with an application node; means for defining a policy indicating the subset of plurality of network nodes and an order of the particular traffic flow associated with the application node through the subset of the plurality of network nodes of the particular service chain; means for distributing the policy to the subset of the plurality of network nodes; means for enforcing the policy to direct the particular traffic flow through the particular service chain, the policy indicating the subset of the plurality of network nodes to be included in the particular service chain, the policy further indicating a data flow order through the subset of the plurality of network nodes; means for monitoring a plurality of network nodes, each network node of the plurality of network nodes providing corresponding network-related functions; and means for, in response to the monitoring, updating the policy and redistributing the policy, once the policy is updated, to the subset of the plurality of network nodes.

Example V

The computing system of example A, wherein the means for identifying the subset of the plurality of network nodes further comprises means for identifying the subset of the plurality of network nodes to be included in the particular service chain based at least on performance information associated with the plurality of network nodes or service availability information associated with the plurality of network nodes.

Example W

The computing system of either of examples U or V, further comprising means for instantiating a new network node; and means for further updating the policy to direct the particular traffic flow through at least the new network node.

Example X

The computing system of example W, further comprising means for determining to instantiate the new network node based at least on performance information associated with the subset of the plurality of network nodes or service availability information associated with the plurality of network nodes.

Example Y

The computing system of example X, wherein the performance information is selected from the group consisting of historical network utilization and real-time network utilization.

Example Z

The computing system of example W, further comprising means for determining to instantiate the new network node based at least on failure of at least one of the subset of the plurality of network nodes.

Example AA

The computing system of any of examples U through Z, further comprising means for identifying the subset of the plurality of network nodes to be included in the particular service chain based at least on load-balancing the plurality of traffic flows amongst the plurality of network nodes.

Example AB

The computing system of example AA, wherein the policy indicates corresponding next-hop node addresses that are selected from a group consisting of layer 2 next-hop addresses, layer 3 next-hop addresses, and a combination of layer 2 next-hop addresses and layer 3 next-hop addresses.

Example AC

The computing system of any of examples U through AB, wherein each network node in the service chain has an ability to distribute the traffic flows across one or more next hops.

Example AD

The computing system of any of examples U through AC, further comprising means for distributing the plurality of traffic flows amongst of the plurality of network nodes based at least in part on weights for each of the plurality of network nodes, and means for determining the weights based at least on performance information for each of the plurality of network nodes.

Example AE

The computing system of any of examples U through AD, further comprising means for inspecting one or more packets of the particular traffic flow, the inspection carried out by a particular network node according to a particular network-related function of the particular network node; and means for further updating, by the particular network node, the policy to redirect the particular traffic flow through at least another network node, the redirect based at least in part on the inspecting, the policy indicating that the particular network node of the subset of the plurality of network nodes of the particular service chain is permitted to update the policy based on the inspecting.

Example AF

A computing system configured to provide a network node, the computing system including: means for receiving performance information associated with at least a plurality of network nodes; means for identifying a subset of the plurality of network nodes to be included in a particular service chain to be used for a particular traffic flow; and means for updating a policy that is associated with the particular traffic flow and that is usable by the subset of the plurality of network nodes to direct the particular traffic flow through the particular service chain, the policy indicating the subset of the plurality of network nodes to be included in the particular service chain, the policy further indicating a data flow order through the subset of the plurality of network nodes.

Example AG

The computing system of example AF, further comprising means for causing a new network node to be instantiated, and wherein the means for updating includes means for updating the policy to direct the particular traffic flow to redirect through at least the new network node.

Example AH

The computing system of either of examples AF or AG, wherein the means for updating is based at least on one of the performance information or a failure of one or more of the subset of the plurality of network nodes.

Example AI

The computing system of any of examples AF through AH, further comprising means for performing a security-related function on one or more packets of the particular traffic flow, wherein the means for updating the policy is based at least on inspection of the one or more packets in accordance with the security-related function, the means for updating including means for updating the policy to redirect the particular traffic flow from at least a first network node to at least a second network node.

Example AJ

A method of providing a network node, the method comprising: receiving performance information associated with at least a plurality of network nodes; identifying a subset of the plurality of network nodes to be included in a particular service chain to be used for a particular traffic flow; and updating a policy that is associated with the particular traffic flow and that is usable by the subset of the plurality of network nodes to direct the particular traffic flow through the particular service chain, the policy indicating the subset of the plurality of network nodes to be included in the particular service chain, the policy further indicating a data flow order through the subset of the plurality of network nodes.

Example AK

The method of example AJ, further comprising causing a new network node to be instantiated, and wherein the updating includes updating the policy to direct the particular traffic flow to redirect through at least the new network node.

Example AL

The computing system of either of examples AJ or AK, wherein the updating is based at least on one of the performance information or a failure of one or more of the subset of the plurality of network nodes.

Example AM

The method of claim 17, further comprising performing a security-related function on one or more packets of the particular traffic flow, wherein the updating the policy is based at least on inspection of the one or more packets in accordance with the security-related function, the updating including updating the policy to redirect the particular traffic flow from at least a first network node to at least a second network node.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computing system to provide a plurality of service chains, the computing system comprising:
   one or more processors;
   memory; and
   a plurality of programming instructions stored on the memory and executable by the one or more processors to perform actions including:
      identifying a subset of a plurality of network nodes to be included in a particular service chain of the plurality of service chains to be used for a particular traffic flow of a plurality of traffic flows, the particular traffic flow associated with an application node;
      defining a policy indicating the subset of plurality of network nodes and an order of the particular traffic flow associated with the application node through the subset of the plurality of network nodes of the particular service chain;
      distributing the policy to a memory in each network node of the subset of the plurality of network nodes to store the policy;
      enforcing the policy to direct the particular traffic flow through the particular service chain, the policy indicating the subset of the plurality of network nodes to be included in the particular service chain, the policy further indicating a data flow order through the subset of the plurality of network nodes;
      monitoring the plurality of network nodes, each of the network nodes of the plurality of network nodes providing corresponding network-related functions; and
      in response to the monitoring, updating the policy and replacing the policy stored in the memory of each of the network nodes of the subset of the plurality of network nodes with the updated policy, once the policy is updated, wherein updating the policy and replacing the policy stored in the memory of each of the network nodes is based on determining that a particular node of one of the plurality of nodes independently modified the policy and in response to receiving notification of the modification from the particular node.

2. The computing system of claim 1, wherein identifying the subset of the plurality of network nodes further comprises identifying the subset of the plurality of network nodes to be included in the particular service chain based at least on performance information associated with the plurality of network nodes or service availability information associated with the plurality of network nodes.

3. The computing system of claim 1, wherein the actions further include:
   instantiating a new network node; and
   further updating the policy to direct the particular traffic flow through at least the new network node.

4. The computing system of claim 3, wherein the actions further include determining to instantiate the new network node based at least on performance information associated with the subset of the plurality of network nodes or service availability information associated with the plurality of network nodes.

5. The computing system of claim 4, wherein the performance information is selected from the group consisting of historical network utilization and real-time network utilization.

6. The computing system of claim 3, wherein the actions further include determining to instantiate the new network node based at least on failure of at least one of the subset of the plurality of network nodes.

7. The computing system of claim 1, wherein the actions further include identifying the subset of the plurality of network nodes to be included in the particular service chain based at least on load-balancing the plurality of traffic flows amongst the plurality of network nodes.

8. The computing system of claim 7, wherein the policy indicates corresponding next-hop node addresses that are selected from a group consisting of layer 2 next-hop addresses, layer 3 next-hop addresses, and a combination of layer 2 next-hop addresses and layer 3 next-hop addresses.

9. The computing system of claim 1, wherein each network node in the service chain has an ability to distribute the traffic flows across one or more next hops.

10. The computing system of claim 1, wherein the actions further include distributing the plurality of traffic flows amongst of the plurality of network nodes based at least in part on weights for each of the plurality of network nodes, the actions further comprising determining the weights based at least on performance information for each of the plurality of network nodes.

11. The computing system of claim 1, further comprising a network layer endpoint node chained between the plurality of network nodes, said network layer endpoint node comprising at least one of a VPN server, an IP tunneling gateway, a proxy server, a network-layer firewall, or a web server node.

12. The computing system of claim 1, further comprising identifying a network layer endpoint node chained between the plurality of network nodes to be included in the particular service chain.

13. A method, comprising:
   identifying a subset of a plurality of network nodes to be included in a particular service chain of a plurality of service chains, the particular service chain for a particular traffic flow associated with an application node, each network node of the plurality of network nodes providing corresponding network-related functions, the particular traffic flow being one of a plurality of traffic flows;
   defining a policy indicating the subset of the plurality of network nodes and an order of the particular traffic flow associated with the application node through the subset of the plurality of network nodes;

distributing the policy to a memory in each network node of the subset of the plurality of network nodes to store the policy;

monitoring capacity information associated with one or more of the plurality of network nodes; and in response to the monitoring, updating the policy and replacing the policy stored in the memory of each of the network nodes of the subset of the plurality of network nodes with the updated policy, once the policy is updated, wherein updating the policy and replacing the policy stored in the memory of each of the network nodes is based on determining that a particular node of one of the plurality of nodes independently modified the policy and in response to receiving notification of the modification from the particular node.

14. The method of claim 13, wherein the capacity information includes information selected from the group consisting of historical network utilization and real-time network utilization.

15. The method of claim 13, further comprising:
causing, based at least on the capacity information, a new network node to be instantiated; and
wherein the updating includes updating the policy to direct the particular traffic flow through at least the new network node.

16. The method of claim 13, wherein the updating includes updating the policy based at least on load-balancing the plurality of traffic flows.

17. One or more hardware storage devices having stored computer-readable instructions which are executable by one or more processors of a computing system to cause the computing system to implement a method that includes:

the computing system identifying a subset of a plurality of network nodes to be included in a particular service chain of a plurality of service chains, the particular service chain for a particular traffic flow associated with an application node, each network node of the plurality of network nodes providing corresponding network related functions, the particular traffic flow being one of a plurality of traffic flows;

the computing system defining a policy indicating the subset of the plurality of network nodes and an order of the particular traffic flow associated with the application node through the subset of the plurality of network nodes;

the computing system distributing the policy to a memory in each network node of the subset of the plurality of network nodes to store the policy;

the computing system monitoring capacity information associated with one or more of the plurality of network nodes; and the computing system, in response to the monitoring, updating the policy and replacing the policy stored in the memory of each of the network nodes of the subset of the plurality of network nodes with the updated policy, once the policy is updated, wherein updating the policy and replacing the policy stored in the memory of each of the network nodes is based on determining that a particular node of one of the plurality of nodes independently modified the policy and in response to receiving notification of the modification from the particular node.

18. The one or more hardware storage devices of claim 17, wherein the method further includes adding a new node to the subset of the plurality of nodes.

* * * * *